(12) United States Patent
Pellerin et al.

(10) Patent No.: US 7,248,373 B2
(45) Date of Patent: Jul. 24, 2007

(54) WORKPIECE CONFIGURATION DETECTION SYSTEM AND METHOD

(75) Inventors: Dan Pellerin, Howell, MI (US); Boris R. Teper, Farmington Hills, MI (US); Brian Hoy, Brighton, MI (US)

(73) Assignee: Durr Systems, Inc, Plymouth, MI (US)

( * ) Notice: Subject to any disclaimer, the term of this patent is extended or adjusted under 35 U.S.C. 154(b) by 414 days.

(21) Appl. No.: 10/722,757

(22) Filed: Nov. 26, 2003

(65) Prior Publication Data

US 2004/0186619 A1    Sep. 23, 2004

Related U.S. Application Data

(60) Provisional application No. 60/456,493, filed on Mar. 21, 2003.

(51) Int. Cl.
*G01B 11/24* (2006.01)

(52) U.S. Cl. .................................................. 356/601

(58) Field of Classification Search ............. 356/601, 356/612–613, 638
See application file for complete search history.

(56) References Cited

U.S. PATENT DOCUMENTS

| | | | | |
|---|---|---|---|---|
| 3,225,810 A | * | 12/1965 | Enabnit ................... | 156/110.1 |
| 3,781,798 A | * | 12/1973 | Hinks ..................... | 382/104 |
| 3,801,957 A | * | 4/1974 | Hogan ..................... | 382/104 |
| 3,810,159 A | * | 5/1974 | Hinks ..................... | 382/104 |
| 3,930,141 A | * | 12/1975 | Koyama et al. ............ | 382/104 |
| 4,419,384 A | | 12/1983 | Kane et al. ............... | 427/57 |
| 4,727,419 A | * | 2/1988 | Yamada et al. ............ | 382/141 |
| 4,784,493 A | | 11/1988 | Turcheck, Jr. et al. ...... | 356/394 |
| 5,206,720 A | * | 4/1993 | Clothiaux et al. .......... | 348/95 |
| 5,469,262 A | * | 11/1995 | Keen et al. ................ | 356/639 |
| 5,850,036 A | | 12/1998 | Giromini et al. ........... | 73/40 |
| 6,124,925 A | * | 9/2000 | Kaneko et al. ............ | 356/237.1 |
| 6,173,213 B1 | | 1/2001 | Amiguet et al. ........... | 700/230 |
| 6,313,422 B1 | | 11/2001 | Anibas .................... | 209/580 |
| 6,484,066 B1 | | 11/2002 | Riess et al. ............... | 700/217 |
| 6,580,046 B1 | | 6/2003 | Koini et al. ............... | 209/564 |
| 6,831,996 B1 | * | 12/2004 | Williams et al. .......... | 382/141 |
| 2003/0065421 A1 | | 4/2003 | Didriksen et al. ......... | 700/230 |

FOREIGN PATENT DOCUMENTS

| | | |
|---|---|---|
| DE | 10017621 A1 | 10/2001 |
| GB | 2201784 A | 9/1988 |
| JP | 04295706 | 10/1992 |

* cited by examiner

*Primary Examiner*—Gregory J. Toatley, Jr.
*Assistant Examiner*—Isiaka O. Akanbi
(74) *Attorney, Agent, or Firm*—Howard & Howard Attorneys, P.C.

(57) ABSTRACT

An assembly includes a platform for supporting and moving a tire along therealong. A light emitter of a first detection assembly transmits a first signal from emitter around the tire in to determine the height of the tire. A light receiver of the first detection assembly receives the transmitted first signal passed around the tire and forwards the first signal to a controller for evaluating the first signal and for determining a first configuration of the tire. A light emitter of a second detection assembly transmits a second signal around the tire in the direction transverse to the direction of the first signal. A light receiver of the second detection assembly receives the transmitted second signal. The second detection assembly is operably connected to the controller. The controller integrates the first and second signals for determining a third configuration of the part thereby identifying the part being evaluated.

22 Claims, 2 Drawing Sheets

WORKPIECE CONFIGURATION DETECTION SYSTEM AND METHOD

RELATED APPLICATION

The subject patent application claims priority to all the benefits of U.S. Provisional Patent Application Ser. No. 60/456,493, filed on Mar. 21, 2003.

FIELD OF THE INVENTION

This invention relates generally to a system and method for measurement of a workpiece, and more particularly to a system and method for automated identification and measurement of rotary members such as tires for motor vehicle.

BACKGROUND OF THE INVENTION

Manual identification, measurement of various dimensions and orientation of mounted units, i.e. wheel and tire assembly for motor vehicle can be time consuming and subject to human error. It has become desirable to process an ever-increasing variety of the wheels and tires, through a single assembly line. Modern assembly lines for production and processing of the wheel and tire assembly for motor vehicles are automated to provide maximum production efficiency. With the advent of flexible manufacturing and the multiplicity of different styles, configurations and dimensions of the wheel and tire assembly, the automated assembly line has become more desirable and efficient.

Typically, the automated assembly line for mounted units includes a conveyor base to accommodate various workstations. These stations include a wheel, i.e. wheel loader assembly designed to position the wheel on a wheel plate operably connected to the conveyor, a wheel soaper assembly for applying a lubricant solution onto the edges of the wheel, wherein the wheel soaper assembly is attached to the wheel loader assembly. A tire soaper assembly for applying the lubricant around inner circumference of the tire before mounting the tire about the wheel to form the wheel is also provided at the assembly line. Generally, the assembly line includes wheel and tire mounting and tire inflation assemblies.

In order to process multiple varieties of the wheel and tire assemblies through the single assembly line, it has become necessary to verify the type of the wheel entering an assembly process so that mechanized assembly devices can assemble the correct components. For example, it has become desirable to mate up to six consecutive wheel sizes with corresponding tires at an assembly facility. To match the correct tire with the correct wheel size and to identify the correct valve stem to be inserted into a given wheel, each wheel must be identified upon entering the assembly process and the various mechanized assembly stages must be signaled which wheel size is to be processed. Because four tires and wheels must be assembled for each vehicle, each wheel or tire entering the assembly line must be identified within a matter of seconds.

The art is replete with various workstations using laser beams and light sources for identifying and orienting various workpieces and parts. The U.S. patent application Publication No. 200300665421 to Didriksen et al. teaches a storage system for receiving, delivering and storing items to be distributed. The size of the items is determined in order to allocate the correct amount of space. The system includes a cylindrical shell part that comprises nine photocells being positioned in a vertical direction. Thus, the height of an item being received by the system and positioned on a platform, is determined by blocking one or more of the photocells.

The U.S. Pat. No. 6,173,213 to Amiguet et al. teaches a system for identifying and orienting a wheel. The system includes a wheel style recognition station, a conveyor for delivering the wheel to the wheel style recognition station, and a wheel orientation sensor that senses the radial orientation of the wheel on the wheel style recognition station, and generates a radial orientation signal. The system includes a wheel-mapping sensor that scans the wheel and generates a wheel style mapping signal pattern, while the wheel is rotated at a steady rate of rotation. The system also includes a control unit, which compares the wheel style mapping signal pattern with at least one reference wheel style mapping signal pattern. These systems have proven to be too slow to evaluate a large number of variously sized wheels and tires.

Other presently known wheel identification stations have utilized video cameras in an attempt to identify a given wheel size. These video identification devices signal a controller, which requires a significant amount of processing to make correct wheel identification. This type of identification device requires a significant amount of computing power to identify wheels at a rapid pace, which has resulted in an excess of cost to produce a wheel identification assembly line.

There is a constant need in the area of the automotive industry for an improved system for and a method of determining a configuration of a workpiece at ever increased speed.

SUMMARY OF THE INVENTION

An assembly for determining the configuration of a workpiece, such as, for example a tire, includes a platform having a longitudinal axis for supporting and moving the tire along the longitudinal axis. A first detection assembly transmits a first signal around the tire in the direction transverse to the longitudinal axis. The first detection assembly receives the transmitted first signal passed around the tire. The first detection assembly is operably connected to a controller. The controller evaluates the first signal received from the first detection assembly thereby determining a first configuration, i.e. heights, of the tire. A second detection assembly transmits a second signal around the tire in the direction transverse to the direction of the first signal. The second detection assembly receives the transmitted second signal around and the tire. The second detection assembly is operably connected to the controller for determining a second configuration, i.e. outer and inner diameters of the tire. The controller integrates the first and second signals for determining a third, i.e. three-dimensional configuration of the tire, thereby identifying the tire being evaluated.

A method of present invention includes the step of orienting the first detection assembly with respect to the platform and transmitting the first signal from the first detection assembly onto the tire in the direction transverse to the platform. The method includes the step of receiving the transmitted first signal around the tire by the first detection assembly. The following step of the method includes evaluating the first signal received from the first detection assembly to determine the first configuration of the part. The next step includes orienting the second detection assembly with respect to the platform followed by transmitting the second signal from the second detection assembly onto the tire in the direction transverse to the direction of the first signal. The method includes receiving the transmitted second signal by the second detection assembly around the tire and evaluating the second signal received from the second detection assembly to determine the second configuration of the tire. The method includes integrating the signals to determine the third, three-dimensional configuration of the tire, thereby identifying the part being evaluated.

An advantage of the present invention is to provide an assembly for and method of identifying the type of workpiece entering an assembly process by virtue of integrating two-dimensional signals for determining three-dimensional configuration of the tire. This has enabled the rapid detection of the size and shape of the tire allowing an increase in the variety of tires being detected while maintaining high production volumes.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
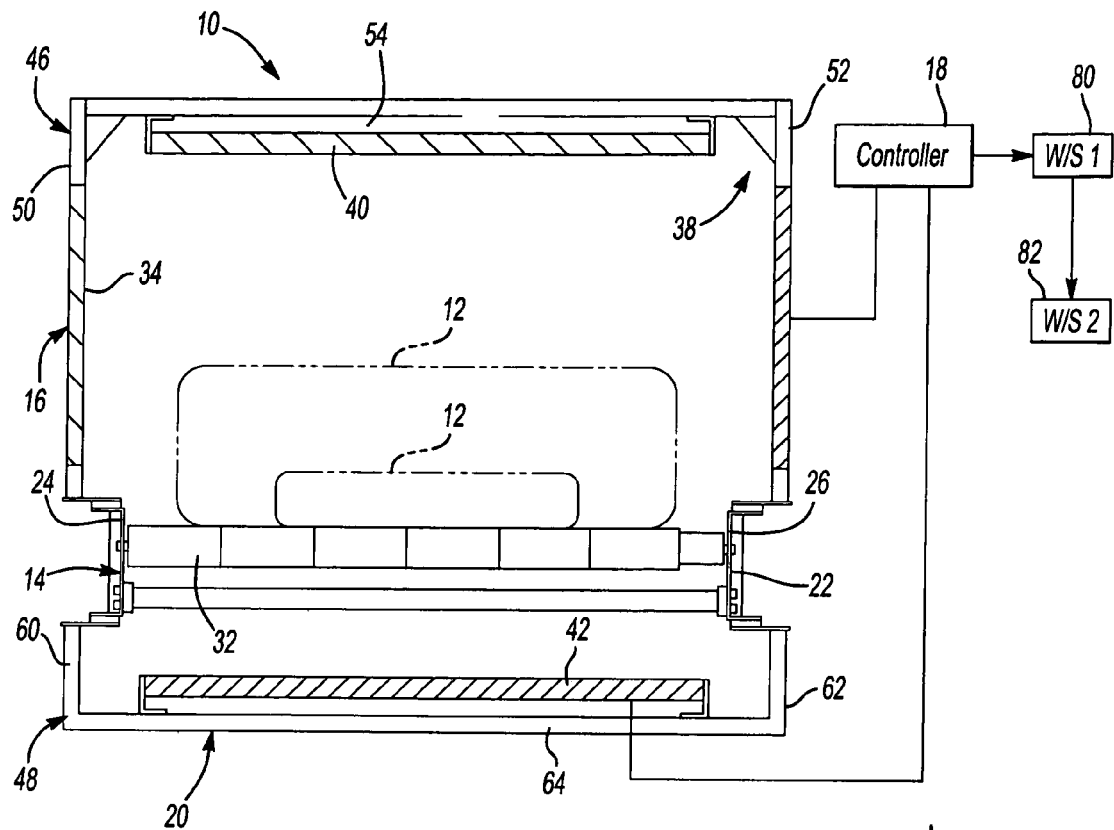
FIG. 1 shows a front view of a workpiece configuration detection assembly.
Figure 2:
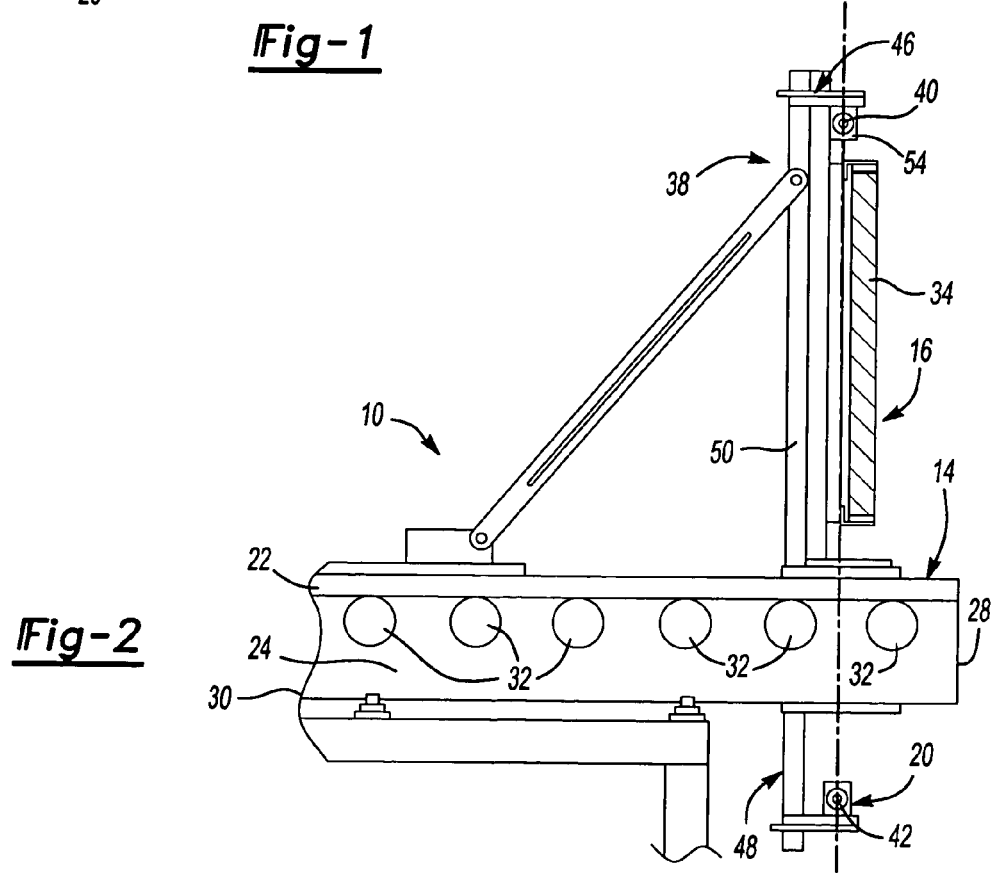
FIG. 2 shows a partial plan view of the workpiece configuration detection assembly.
Figure 3:
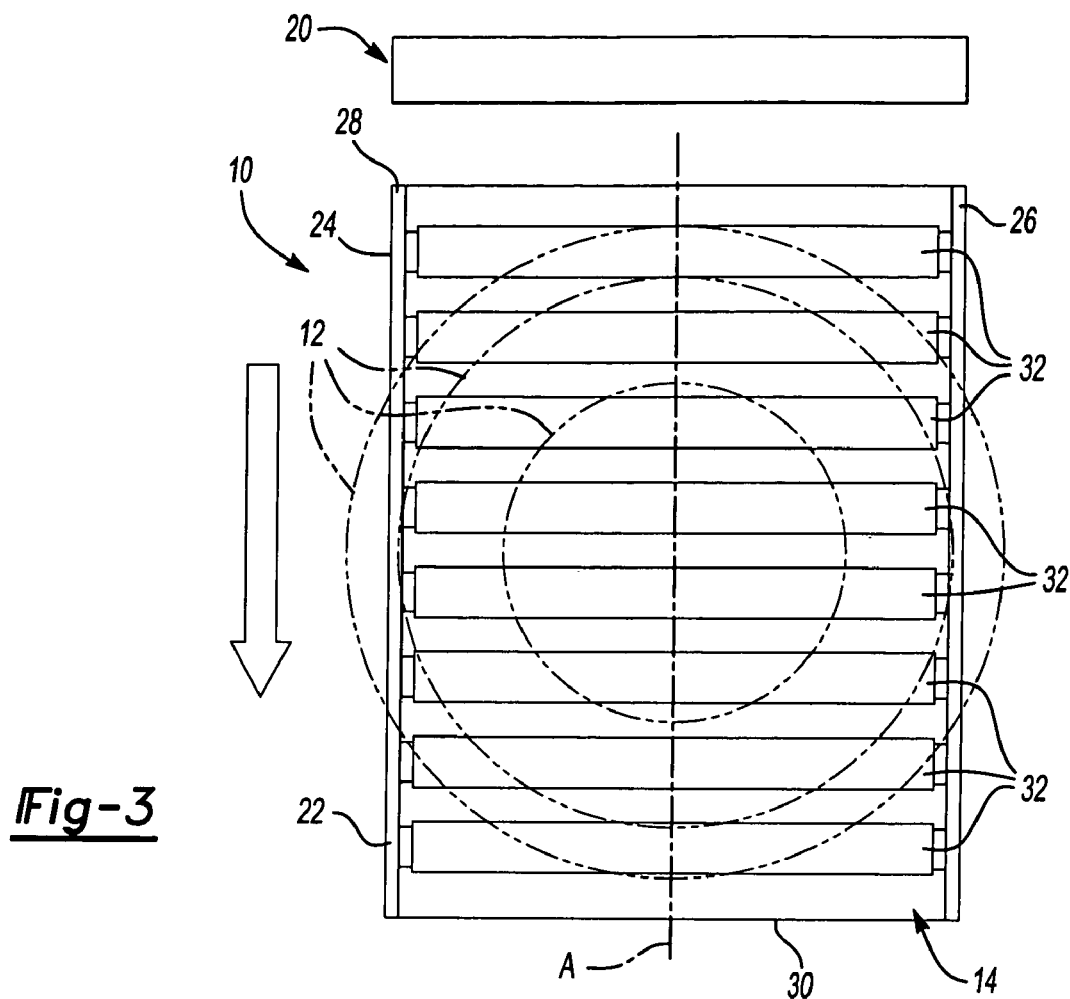
FIG. 3 shows a top view of the workpiece configuration detection assembly.
Figure 4:
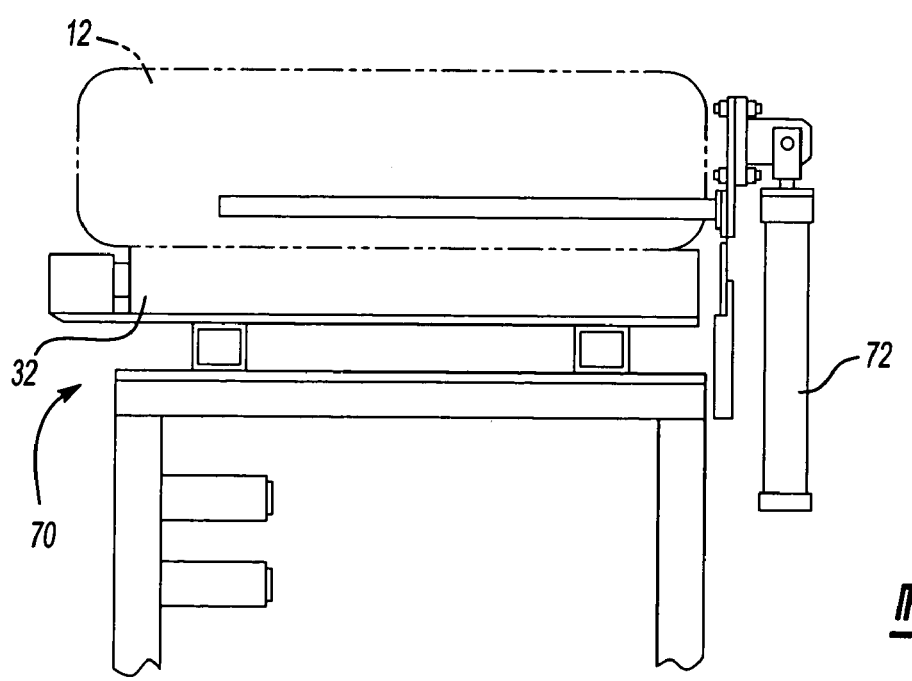
FIG. 4 shows a conveyance device for receiving the workpiece from the workpiece configuration detection assembly and transferring the workpiece to an assembly line.

An assembly for determining the configuration of a workpiece of the present invention is generally shown at 10 in FIGS. 1 through 3. The workpiece includes tires, wheels or any other component being processed through an assembly line, hereinafter, referred to as a tire and shown at 12.

The assembly 10 includes a platform, generally indicated at 14, having a longitudinal axis A, as shown in FIG. 3, for supporting and moving the tire 12 along the longitudinal axis A. A first detection assembly, generally indicated at 16 transmits a first signal around the tire 12 in the direction transverse to the longitudinal axis A. The first detection assembly 16 receives the transmitted first signal passed around the tire 12. The first detection assembly 16 is operably connected to a controller 18. The controller 18 evaluates the first signal received from the first detection assembly 16 thereby determining a first configuration, i.e. heights, of the tire 12. A second detection assembly, generally indicated at 20, transmits a second signal around the tire 12 in the direction transverse to the direction of the first signal. The second detection assembly 20 receives the transmitted second signal around the tire 12. The second detection assembly 20 is operably connected to the controller 18 for determining a second configuration, i.e. outer and inner diameters of the tire 12. The controller 18 integrates the first and second signals for determining a third, i.e. three-dimensional configuration of the tire 12, thereby identifying the tire 12 being evaluated. The controller 18 includes a comparative program for determining the three dimensional configuration of the tire 12 from the first and second configurations.

The platform 14 includes a frame 22 having side walls 24, 26 and terminal ends 28, 30. The side walls 24, 26 of the platform 14 include a plurality of rollers, i.e. roller bars 32, which are pivotally supported between the side walls 24, 26. The roller bars 32 are spaced one from the other for supporting the tire 12 being transferred therethrough. While roller and belt type of conveyor platforms may be employed, both being well known to those skilled in the art, only the roller type conveyor platform 14 configuration has been described. Hence, the roller type conveyor platform 14 configuration used in the workpiece configuration detection system 10 is not intended to limit the present invention.

The first detection assembly 16 includes a light emitter 34 for transmitting the first signal, i.e. light, and a light receiver 36 for receiving the first signal. The light emitter 34 and receiver 36 of the first detection assembly 16 are spaced one from the other and connected to the side walls 24, 26, respectively, by a support mount, generally shown at 38 in FIG. 1 and discussed further below. The light emitter 34 and light receiver 36 of the first detection assembly 16 include a length greater than the largest height of the tire 12 being transferred through the platform 14.

The second detection assembly 20 also includes a light emitter 40 and a light receiver 42 for transmitting and receiving the second signal, i.e. light. The light emitter 40 and receiver 42 of the second assembly 20 are operably connected to the support mount 38 and are spaced from one and the other by the light emitter 34 and receiver 36 of the first detection assembly 16, wherein the light emitter 40 is positioned above the platform 14 and the light receiver 42 is positioned beneath the platform 14. The light emitter 40 and light receiver 42 of the second detection assembly 20 include a length greater than the largest diameter of the tire 12 being transferred through the platform 14.

The light emitters 34, 40 of the first 16 and second 20 detection assemblies include a plurality of light emitting sources (not shown) grouped one with the other. The light receivers 36, 42 of the first 16 and second 20 detection assemblies include a plurality of light absorbing sources, i.e. silicone photodiodes, (not shown) grouped one with the other and aligned with respect to complementary light emitting sources. Preferably, each light receiver 36, 42 is a beam array receiver, which detects the transmission of light at a given location along the light receivers 36, 42. For example, by blocking a transmission of light to a particular area, the beam array receivers, i.e. the light receivers 36, 42 generate a signal that distinguishes the area that receives the transmitted light arrays and the area that does not receive the transmitted light rays, i.e., light vs. dark. By distinguishing light vs. dark, the light receivers 36, 42 generate a signal representing the basic outline of the tire 12, such as, for example the inside and outside diameters and the height of the tire 12. Hence, the orientation of the plurality of light absorbing sources, grouped one with the other and aligned with respect to the complementary light emitting sources used in the workpiece configuration detection system 10 is not intended to limit the present invention.

Referring again to FIGS. 2 and 3, the support mount 38 is positioned at the terminal end 28 of the platform 14 for supporting and for orienting the first 16 and second 20 detection assemblies around the platform 14. The support mount 38 includes upper section, generally indicated at 46, and lower section, generally indicated at 48. The upper section 46 defined by a pair of vertical support beams 50, 52 for vertical orientation of the light emitter 34 and receiver 36 of the first detection assembly 16, having terminal ends and spaced one from the other and connected to the frame 14 at one of the terminal ends, respectively. The upper section 46 includes a horizontal support beam 54 supported by and disposed between the vertical support beams 50, 52. The horizontal beam 54 of the upper section 46 is designed for horizontal orientation of the light emitter 40 of the second detection assembly 20. The light emitter 34 and light receiver 36 of the first detection assembly 16 are connected to the vertical support beams 50, 52 of the upper section 46, respectively. The light emitter 40 of the second detection assembly 20 is connected to the horizontal support beam 54 of the upper section 46.

The lower section 48 includes a pair of vertical support beams 60, 62 having terminal ends and being spaced one from the other and connected to the frame 14. A horizontal support beam 64 of the lower section 48 is supported by and disposed between the vertical support beams 60, 62 of the lower section 48 and between the roller bars 32. Similar to the horizontal beam 54 of the upper section 46, the horizontal beam 64 of the lower section 48 is designed for horizontal orientation of the light receiver 42 of the second detection assembly 20.

A method of determining the configuration of the tire 12 of present invention is now being discussed. The method includes the step of orienting the first detection assembly 16 with respect to the platform 14 to transmit the first signal from the light emitter 34 of the first detection assembly 16 onto the tire 12 in the direction transverse to the longitudinal axis A of the platform 14. The next step of the method includes receiving the transmitted first signal around and through the tire 12 by the light receiver 36 of the first detection assembly 16. The following step includes evaluating the first signal received from the first detection assembly 16 to determine the heights of the tire 12.

The next step of the method includes orienting the second detection assembly 20 with respect to the platform 14 followed by transmitting the second signal from the second detection assembly 20 onto the tire 12 in the direction transverse to the direction of the first signal. The method includes receiving the transmitted second signal by the second detection assembly 20 around and through the tire 12 and evaluating the second signal received from the second detection assembly 20 to determine the inner and outer diameters of the tire 12. The method includes integrating the signals to determine the three dimensional configuration of the tire 12 thereby identifying the tire 12 being evaluated During operation, the tire 12 passes through the support mount 38 supporting the light emitters 34, 40 and the light receivers 36, 42. As the tire 12 passes the support mount 38, light transmitted from the emitter 40 is blocked by the tire 12 and therefore does not reach the light receiver 42. By virtue of the blocked light arrays, the light receiver 42 generates the second signal to the controller 18 so that the controller 18 can determine the inside and outside diameters of the tire 12 passing through the support mount 38. In a similar fashion, light arrays generated by the light emitter 34 is blocked by the tire 12 so that only a fraction of the light generated by the light emitter 34 reaches the light receiver 36. The light receiver 36 transmits the first signal based upon the light blocked from the light emitter 34 to the controller 18 so that the controller 18 can determine the height of the tire 12 passing through the support mount 38. A conveyance device generally shown at 70 in FIG. 3, receives the tire 12 from a prior stage such as, for example, a tire soaper (not shown), and transfers the tire 12 into an assembly line (not shown). A cylinder 72 or an equivalent orients the conveyance device 70 so that the tire 12 derives motion and is propelled across the roller bars 32 disposed in the platform 14.

The controller 18 is pre-programmed with inside diameters, outside diameters, and height of the various tire 12 sizes being processed so that the controller 18 can identify which tire 12 is passing through the support mount 38 and signals subsequent work stations 80, 82, such as, for example a wheel soaper station and a wheel loader station, respectively, with the type of tire 12 entering the assembly process. By signaling the subsequent work stations 80, 82, the appropriate wheel (not shown) can be mated with each tire 12 passing through the platform 14 in the absence of the processing error that results in matching the correct wheel with the correct tire 12.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An assembly for determining the configuration of a part, comprising:
    a platform having a longitudinal axis for supporting and moving the part along said longitudinal axis to various workstations;
    a first detection assembly for transmitting a first signal around and the part in a direction transverse to said longitudinal axis and for receiving the transmitted first signal passed around the part;
    a controller for evaluating said first signal received from said first detection assembly thereby determining a first configuration of the part;
    a second detection assembly for transmitting a second signal around and the part in the direction transverse to the direction of said first signal and for receiving the transmitted second signal around and the part;
    said second detection assembly being operably connected to said controller for determining a second configuration of the part whereby said controller integrates said first and second signals for determining a third configuration of the part thereby identifying the part as the part is moved to a subsequent workstation; and
    said controller having a comparative program for integrating said first configuration and said second configuration thereby establishing a third configuration of the part used to identify the part being evaluated from said controller programmed with said third configuration for directing said subsequent work station to perform work relative to the identified part.

2. An assembly as set forth in claim 1, wherein said first detection assembly determines the height of the part.

3. An assembly as set forth in claim 2, wherein said second detection assembly determines the outer diameter of the part.

4. An assembly as set forth in claim 3, wherein said second detection assembly determines the inner diameter of the part.

5. An assembly as set forth in claim 4, wherein said first and second signals include a beam of light.

6. An assembly as set forth in claim 5, wherein said second detection assembly being spaced between said first detection assembly.

7. An assembly as set forth in claim 6, wherein said second detection assembly includes a light emitter for transmitting said second signal.

8. An assembly as set forth in claim 7, wherein said light emitter being positioned above said platform.

9. An assembly as set forth in claim 8, wherein said second detection assembly includes a light receiver for receiving said second signal.

10. An assembly as set forth in claim 9, wherein said light receiver being positioned below said platform.

11. An assembly as set forth in claim 10, wherein said first detection assembly includes a light emitter for transmitting said first signal.

12. An assembly as set forth in claim 11, wherein said first detection assembly having a light receiver for receiving said first signal.

13. An assembly as set forth in claim 12, wherein the part is a tire.

14. A method of determining the configuration of a part, comprising the steps of:
    orienting a first detection assembly with respect to a platform extending to multiple workstations;
    transmitting a first signal from the first detection assembly onto the part in the direction transverse to the platform;
    receiving the transmitted first signal around the part by the first detection assembly;
    evaluating the first signal received from the first detection assembly to determine a first configuration of the part;
    orienting a second detection assembly with respect to the platform;
    transmitting a second signal from the second detection assembly onto the part in the direction transverse to the direction of the first signal;
    receiving the transmitted second signal by the second detection assembly around the part;
    evaluating the second signal received from the second detection assembly to determine a second configuration of the part; and
    integrating the first configuration and the second configuration thereby establishing a third configuration used to identify the part being evaluated from a controller programmed with the third configuration;
    directing subsequent work station to perform work relative to the identified part.

15. A method as set forth in claim 14, wherein the step of integrating the signals to determine a third configuration of the part is further defined as determining a three dimensional configuration of the part.

16. A method as set forth in claim 15, wherein the step of determining the first configuration of the part is further defined as determining a height of the part.

17. A method as set forth in claim 16, wherein the step of determining the second configuration of the part is further defined as determining an inner diameter of the part.

18. A method as set forth in claim 17, wherein the step of determining the second configuration of the part is further defined as determining an outer diameter of the part.

19. A method as set forth in claim 18, wherein the step of orienting the first detection assembly with respect to the platform is further defined as positioning a light emitter to transmit the first signal onto the part in the direction transverse to the platform.

20. A method as set forth in claim 19, wherein the step of orienting the first detection assembly with respect to the platform is further defined as positioning a light receiver to receive the transmitted first signal around and through the part.

21. A method as set forth in claim 20, wherein the step orienting the second detection assembly with respect to the platform is further defined as positioning another light emitter to transmit the second signal onto the part in the direction transverse to the direction of the first signal.

22. A method as set forth in claim 21, wherein the step of orienting the second detection assembly with respect to the platform is further defined as positioning another light receiver to receive the transmitted second signal around and through the part.

* * * * *

UNITED STATES PATENT AND TRADEMARK OFFICE
CERTIFICATE OF CORRECTION

| | | |
|---|---|---|
| PATENT NO. | : 7,248,373 B2 | Page 1 of 1 |
| APPLICATION NO. | : 10/722757 | |
| DATED | : July 24, 2007 | |
| INVENTOR(S) | : Dan Pellerin, Boris R. Teper and Brian Hoy | |

It is certified that error appears in the above-identified patent and that said Letters Patent is hereby corrected as shown below:

Column 7, line 34, please delete the space preceding the step beginning with the word "orientating."

Signed and Sealed this

Ninth Day of October, 2007

JON W. DUDAS
*Director of the United States Patent and Trademark Office*